April 7, 1970   F. C. MOORE ET AL   3,505,031
WEIGHING AND POURING VESSEL
Filed Oct. 26, 1966

INVENTORS:
FRANCIS C. MOORE
LEON R. PERKINSON
BY Dawson, Tilton, Fallon, Lungmus & Alexander
ATT'YS

United States Patent Office 3,505,031
Patented Apr. 7, 1970

3,505,031
WEIGHING AND POURING VESSEL
Francis C. Moore and Leon R. Perkinson, Indianapolis, Ind., assignors to Moore-Perk Corporation, Indianapolis, Ind., a corporation of Indiana
Filed Oct. 26, 1966, Ser. No. 589,581
Int. Cl. B01l 3/00; B65d 1/34
U.S. Cl. 23—292                                        6 Claims

ABSTRACT OF THE DISCLOSURE

Article suitable for use as a weighing or pouring vessel for laboratory use. The article is an integral vessel formed entirely of resilient, smooth, flexible plastic sheet material including a base, side walls, and an upper peripheral lip or flange. The vessel may be carried with one hand; and it may easily be formed into a pouring vessel by urging diagonally opposite corners together to thereby urge the lip at the two other corners away from the base of the vessel and into general alignment with the corners to form a pouring spout.

---

Figure 1:
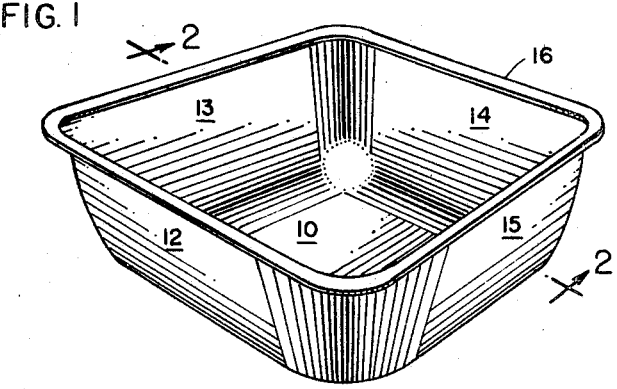

This invention relates to a weighing vessel; and more particularly, to a small, disposable, general-purpose vessel for use in a laboratory.

In the past, laboratory utensils have been suited for particular purposes, and there has been no general-purpose, easily disposable lab ware suitable for use with both liquids and powders as either a weighing vessel or a pouring utensil. Existing disposable lab ware includes the common weighing paper which is a flat, circular disc of white paper which may be thrown away after use. Weighing paper is suitable for use in weighing powder and granules, but it is not suitable for use in transporting or pouring liquids. Further, weighing paper is not really convenient for pouring a substance which has been weighed since it requires the use of both hands to prevent spilling of the material, whereas it is frequently desired to hold the weighed material in one hand and the container into which it is being poured in the other. Hence, although the weighing paper has the advantage of being economical and therefore disposable, it has the disadvantages of being unwieldly in transporting a substance after weighing, and inconvenient and awkward for pouring. Finally, they are not suited for use with liquids, and there is a restriction on the amount of material which can be held without spilling due to the fact that there are no walls to contain the material.

Lab ware which is suited for use as both a weighing and a pouring utensil is the common porcelain or heavy glass hardware which, although it is convenient for transporting and pouring operations, must necessarily be washed after each use thereby requiring a relatively long drying time if it is desired that the utensil be chemically dry before another use. Such containers also admit of possible contamination from previous samples.

A principal object of the present invention is to provide an article suitable for general-purpose laboratory use which is disposable thereby requiring that it be economical and conveniently stored in quantity.

Another object of the present invention is to provide a convenient, economical weighing vessel which has a boat-like shape for increasing its capacity, and yet one which requires the use of only one hand for carrying.

A further object of the invention is to provide a utensil which is suitable for use in transporting or pouring both liquids and powders.

An even further object of the present invention is to provide a laboratory utensil which may be thoroughly cleaned with a wash bottle, and one which is easily handled with forceps.

The above objects are accomplished by forming a weighing vessel of greater length than depth with a bottom and four outwardly disposed walls defining a generally square horizontal cross section. The entire vessel is unitary in construction and composed of polystyrene and rubber. The upper edge of the vessel is trimmed with a generally horizontal, sharp lip portion; and the corners at all the edges and between the edges and bottom are rounded to prevent secretion of the substance being weighed. The vessel is of convenient size for lifting and carrying in one hand. When it is thus carried, pressure exerted between the thumb and fingers to force two opposite corners together, will form the vessel into a convenient pouring utensil by forcing the lip portion at the other two corners, to form a smoother contour with the corner of the walls to provide a sharp pouring edge.

Figure 2:
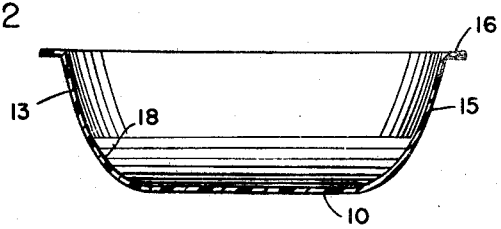

Other objects and advantages of the present invention will be obvious to those skilled in the art from the following detailed description accompanied by the attached drawing in which:

FIG. 1 is a perspective view of a weighing vessel according to the present invention taken above a corner;
FIG. 2 is a side sectional view of the vessel of FIG. 1; and
FIG. 3 is a perspective view of the vessel of FIGS. 1 and 2 showing how it is conveniently transported and converted into a pouring vessel by a simple motion of one hand.

Referring then to the drawing, and particularly to FIGS. 1 and 2, the weighing vessel comprises a base or bottom portion 10 and four generally vertical, but outwardly disposed, side walls 12, 13, 14, and 15. Integral with the top of the side walls 12, 13, 14, and 15, is a normally horizontal lip portion, designated by reference numeral 16. The lip 16 forms a complete peripheral flange about the top of the vessel, and provides convenient means for lifting the vessel by hand or with forceps.

In order to obviate the problem of secretion of substances being weighed in corners or crevices, the base portion and its integral walls 12–15 are formed into rounded lower corners as at 18 (FIG. 2) to form a relatively smooth and continuous contour in the dish portion.

Figure 3:
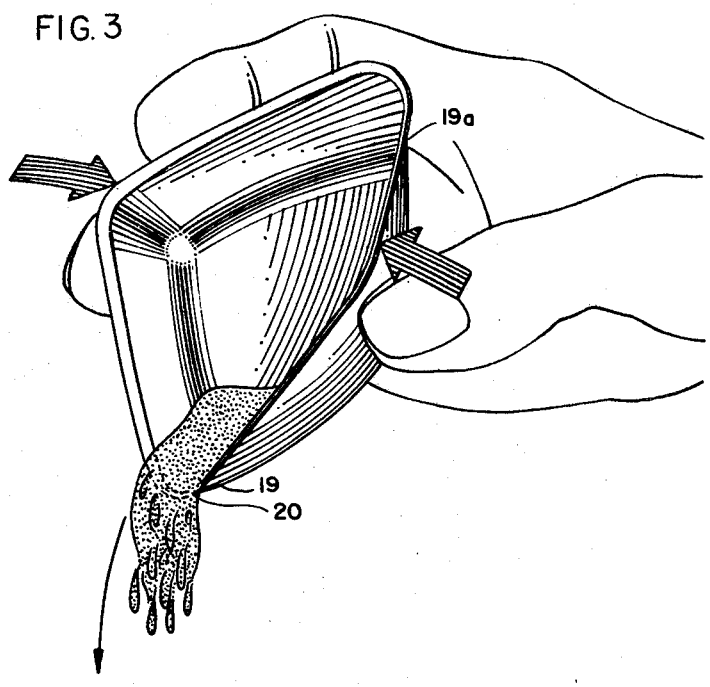

As shown in FIG. 3, the pouring position of the vessel is formed by the application of pressure of a thumb and fingers to force diametrically opposite corners of the vessel toward one another. In this position, the two other corners (designated in FIG. 3 as 19 and 19a) are forced into an extended diagonal position, and thereby force the lip 16 to rotate from its position parallel to the bottom 10 to form a continuous spout (as seen at 20) with the corner 19. A sharp pouring spout is thereby formed, suitable for use with either liquids, powders or granules. The diagonal dimension of the base 10 is preferably less than about five inches across for comfortable handling. The diagonal dimension between opposing corners of the lip 16 will, of course, be greater.

It will be further noted from FIG. 2, that the side walls 12, 13, 14 and 15 are generally upwardly and outwardly formed with respect to the bottom 10, and do not take an exactly vertical position. This is for convenience of holding in one's hand; and it facilitates the forming of the pouring spout at corners, as well as nesting of the vessels for storage or shipment. Since the vessel is made of a resilient material, as described in more detail below, it readily springs into its original shape after the pouring operation, and may be washed and reused if desired yet is economical enough to be discarded if fear of contamination is to be avoided. As mentioned, the vessel may easily be moved or carried with forceps, if desired, by clamping at the peripheral lip portion.

EXAMPLE

A specific example of a preferred vessel constructed according to the above description will now be given. The portion of the base 10 which is substantially flat forms a square 2¼″ on each side. The distance between the outer extremes of two facing lip portions 16 is 3 3/16″ square including a ⅛″ lip width. The depth of the vessel is approximately 1″. The material used is a high impact polystyrene with a small amount of rubber mixed therewith for resiliency.

The above dimensions have been found to provide a very convenient vessel for general-purpose lab use. In its more general aspects as a convertible pouring utensil, the invention will preferably have a greater width than depth to facilitate the formation of the spout.

It can be seen that the above-described vessels can easily be manufactured as by vacuum forming techniques to provide a disposable, economical weighing vessel. It can also be seen that this vessel forms a convenient container for either solid material, liquids or granules, and is designed for complete emptying of the vessel by means of a convenient pouring spout arrangement.

The radius of curvature of the round between the base and side walls is approximately ¼″.

It will be obvious to those skilled in the art that the weighing vessel of the present invention may be modified taking slightly different forms and shapes, and it is intended that it not be limited to the specific example described and embodiment illustrated, but that it cover all such obvious modifications within the spirit and scope of the appended claims.

What is claimed is:

1. A hand vessel for containing or pouring materials comprising:
   a flat square base composed of a mixture of polystyrene and rubber having an edge dimension of approximately two inches;
   four side walls of the same material as and integral with said base, and disposed slightly outwardly and upwardly from said base, the corners of adjacent walls and of said walls and said base being rounded to form a smoothly continuous vessel; and
   a lip of the same material as said base and integral with the top of and outwardly disposed from said walls, said lip having a width of one-eighth inch and extending in one plane to form a complete upper periphery of said vessel; characterized in that the edge of said vessel between said lip and said side walls at a first pair of diagonally-opposite corners straightens out when the second pair of diagonally-opposite corners are urged together to cause said lip at said first pair of corners to form a continuation of said side walls for pouring.

2. An article for containing liquids or solids and adaptable to pour the same while held in one hand comprising: an integral vessel formed entirely of resilient, smooth, flexible plastic sheet material, said vessel including a flat base of generally square shape and having a diagonal dimension of not longer than about five inches, four side walls integral with said base and disposed upwardly and outwardly thereof to provide a first and a second pair of diagonally opposite corners, said corners and the intersections of said walls and said base being rounded to prevent the secretion of the material, the height of said walls above said base being less than about one inch to provide a shallow vessel, and a lip integral with and continuous around the upper edge of said side walls and extending in a plane parallel with said base, said lip rounded at the corners of said side walls, whereby said vessel provides a shallow, boat-like container when resting on its base and a hand-pouring utensil when a first pair of said diagonally opposite corners are pressed toward each other thereby to form a spout at each of said second pair of diagonally opposite corners by rotating the lip at said last-named corners away from said base and into alignment with the wall portion of its associated corner to form a continuation of said corner.

3. The structure of claim 2 wherein the vessel is approximity three and three-sixteenths inches square at the periphery of said lip and said lip is one-eighth of an inch wide.

4. The structure of claim 2 wherein the radius of curvature of the round of said corner and the round between said walls and said base is approximately one-quarter of an inch.

5. The structure of claim 2 characterized by the fact that the material comprises high impact polystyrene.

6. The structure of claim 5 further characterized by said material containing rubber for resiliency of said vessel.

References Cited

UNITED STATES PATENTS

| 1,296,353 | 3/1919 | Auer | 222—215 X |
| 2,481,525 | 9/1949 | Mott | 249—127 |
| 2,712,224 | 7/1955 | Roethel | 249—134 X |
| 2,768,667 | 10/1956 | Hill | 150—.5 |
| 2,816,589 | 12/1957 | Tupper | 150—.5 |
| 2,990,948 | 7/1961 | Zackheim | 229—2.5 X |
| 3,290,413 | 12/1966 | Fettes | 260—892 X |

JOSEPH SCOVRONEK, Primary Examiner

U.S. Cl. X.R.

23—259; 150—.5; 222—527